US008485239B2

(12) United States Patent
Ballarotti et al.

(10) Patent No.: US 8,485,239 B2
(45) Date of Patent: Jul. 16, 2013

(54) MACHINE FOR LABELING BY MEANS OF PRE-PASTED LABELS PRINTED ON A RIBBON

(75) Inventors: Mario Ballarotti, Marmirolo (IT); Nicola Schinelli, Porto Mantovano (IT)

(73) Assignee: P.E. Labellers S.p.A., Porto Mantovano (IT)

( * ) Notice: Subject to any disclaimer, the term of this patent is extended or adjusted under 35 U.S.C. 154(b) by 0 days.

(21) Appl. No.: 13/139,337

(22) PCT Filed: Dec. 17, 2009

(86) PCT No.: PCT/EP2009/067459

§ 371 (c)(1), (2), (4) Date: Jun. 13, 2011

(87) PCT Pub. No.: WO2010/072654

PCT Pub. Date: Jul. 1, 2010

(65) Prior Publication Data

US 2011/0247758 A1 Oct. 13, 2011

(30) Foreign Application Priority Data

Dec. 23, 2008 (IT) ............................ MN2008A0030

(51) Int. Cl.

| | |
|---|---|
| ***B29C 65/00*** | (2006.01) |
| ***B32B 37/00*** | (2006.01) |
| ***B32B 38/04*** | (2006.01) |
| ***B32B 38/10*** | (2006.01) |

(52) U.S. Cl.

USPC ............ 156/518; 156/521; 156/363; 156/556

(58) Field of Classification Search

USPC ................................. 156/518, 521, 363, 556

See application file for complete search history.

(56) References Cited

U.S. PATENT DOCUMENTS

| | | | | |
|---|---|---|---|---|
| 3,772,123 | A | 11/1973 | Clark et al. | |
| 4,181,555 | A * | 1/1980 | Hoffmann | 156/265 |
| 4,242,168 | A | 12/1980 | Carter | |
| 5,405,482 | A | 4/1995 | Morrissette et al. | |
| 6,543,505 | B1 * | 4/2003 | Harte | 156/350 |
| 2006/0144521 | A1 | 7/2006 | Esposito et al. | |
| 2006/0260756 | A1 | 11/2006 | Spatafora | |
| 2010/0018650 | A1 | 1/2010 | Ballarotti | |

FOREIGN PATENT DOCUMENTS

| | | |
|---|---|---|
| DE | 2311766 | 10/1974 |
| DE | 2632332 | 1/1978 |
| DE | 3314730 | 10/1984 |
| WO | WO 2008/077457 | 7/2008 |

OTHER PUBLICATIONS

Italian Search Report in the corresponding priority application MN2008A000030.

* cited by examiner

*Primary Examiner* — Linda L Gray

(74) *Attorney, Agent, or Firm* — Greer, Burns & Crain Ltd.

(57) ABSTRACT

A machine for labeling by way of pre-pasted labels printed on a ribbon, comprising a rotating carousel provided with pans for supporting containers to be labeled, and a drum for cutting and transferring each individual label onto the containers which, in the motion of the carousel, progressively face the drum, the machine further comprising a rotating roller, which is adapted to receive from the drum each label designed to be applied to a container that is not present on the corresponding pan of the carousel.

5 Claims, 2 Drawing Sheets

MACHINE FOR LABELING BY MEANS OF PRE-PASTED LABELS PRINTED ON A RIBBON

TECHNICAL FIELD

The present invention relates to a machine for labeling by means of pre-pasted labels printed on a ribbon.

BACKGROUND ART

It is known that the practice of printing on a ribbon labels designed to be applied to successive containers, the ribbon being wound in the form of a roll and being provided with a film of glue at the face designed to adhere to the containers to be labeled, is currently widespread: one thus speaks of pre-pasted labels.

Labeling machines that work on pre-pasted labels provide, according to a usual embodiment, for the presence of a rotating carousel provided with pans for supporting the individual containers to be labeled and with a drum which cuts the ribbon in order to separate each individual label and transfer it onto a container, and said machines are often inserted in packaging lines which for example comprise upstream a filling machine and a capping machine.

Due to a malfunction of one of the upstream machines, it may happen that a container is missing in the plurality that reaches the labeling machine at high speed, and therefore the pan that should have accommodated the missing container remains empty.

The packaging line does not stop and accordingly malfunctions on the labeling machine occur.

DISCLOSURE OF THE INVENTION

The aim of the present invention is to provide a labeling machine that can ensure correct operation even if containers are missing on the feeding line.

This aim is achieved by a machine for labeling by means of pre-pasted labels printed on a ribbon, according to the invention, as defined in the appended claims.

BRIEF DESCRIPTION OF THE DRAWINGS

Further characteristics and advantages of the invention will become better apparent from the description of two preferred but not exclusive embodiments thereof, illustrated by way of non-limiting example in the accompanying drawings, wherein.

WAYS OF CARRYING OUT THE INVENTION

Figure 1:
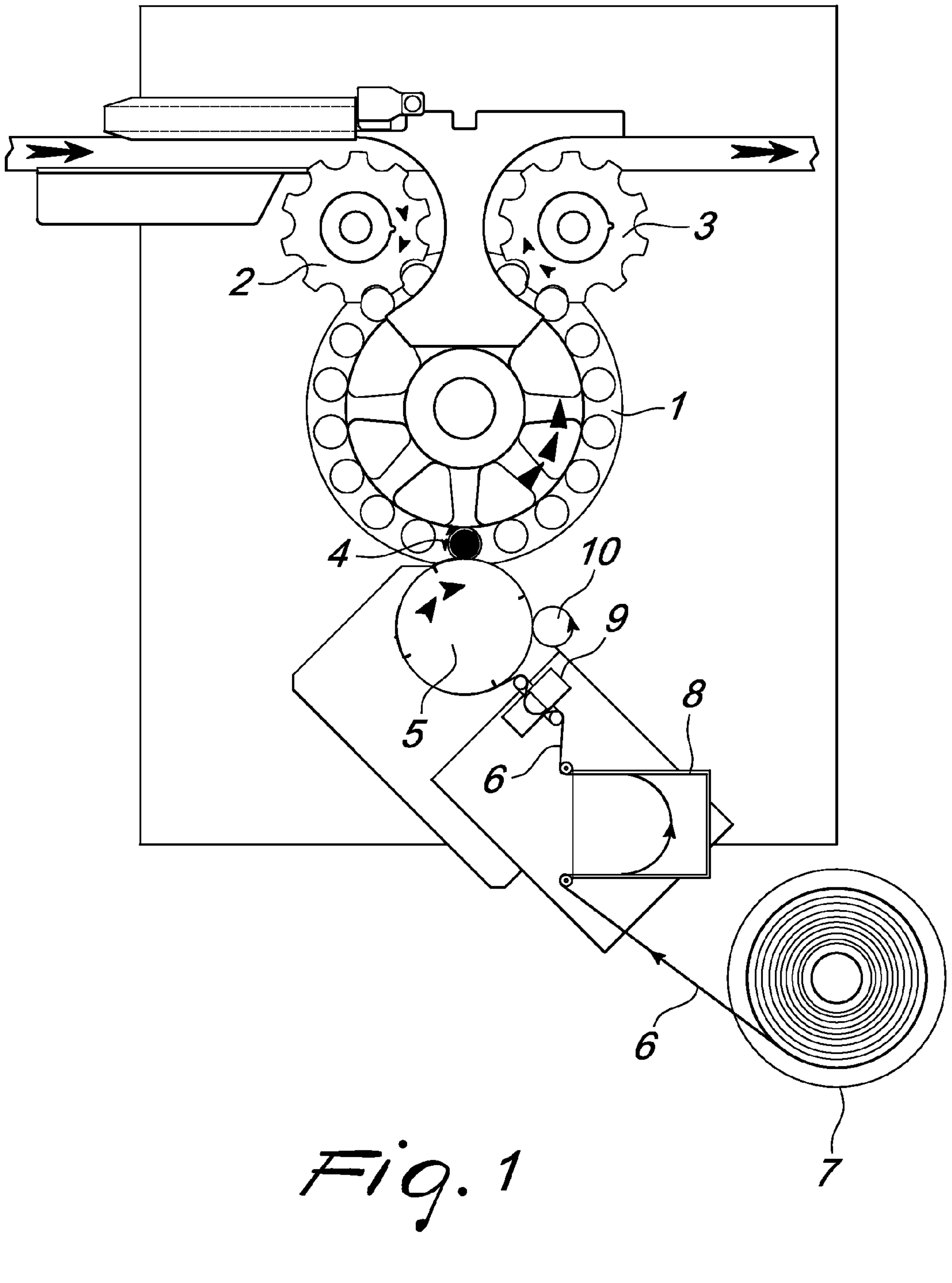
FIG. 1 is a schematic plan view of the machine according to the invention.

With reference to the figures, the reference numeral 1 designates a rotating carousel for supporting the containers to be labeled, which are fed by means of an input star conveyor 2 and evacuated by means of an output star conveyor 3. Such carousel is provided with pans for supporting the individual containers which are suitably rotated, and the reference numeral 4 designates a pan that supports the container which, if it were present, would be ready to receive the corresponding label at the instant shown; the black coloring of the pan is intended to point out the fact that the container is missing on the pan.

The labeling machine further comprises a drum 5, which cuts a ribbon 6 that reaches it by unwinding from a roll 7 by way of the action of a tensioner 8 and a feeder 9, in order to separate each individual label and transfer it to a corresponding container.

Considering the embodiment shown in FIG. 1, a rotating roller 10 is provided, which is substantially in contact with the drum 5 downstream of the tangent position of the drum with respect to the rotating carousel. The roller 10 receives each label that has not found a corresponding container on the carousel 1, accommodating it on itself until it stores even a considerable quantity of overlapping labels by way of the contraction of volume that it can undergo, since it is made of a spongelike material or of elastic material.

Figure 2:
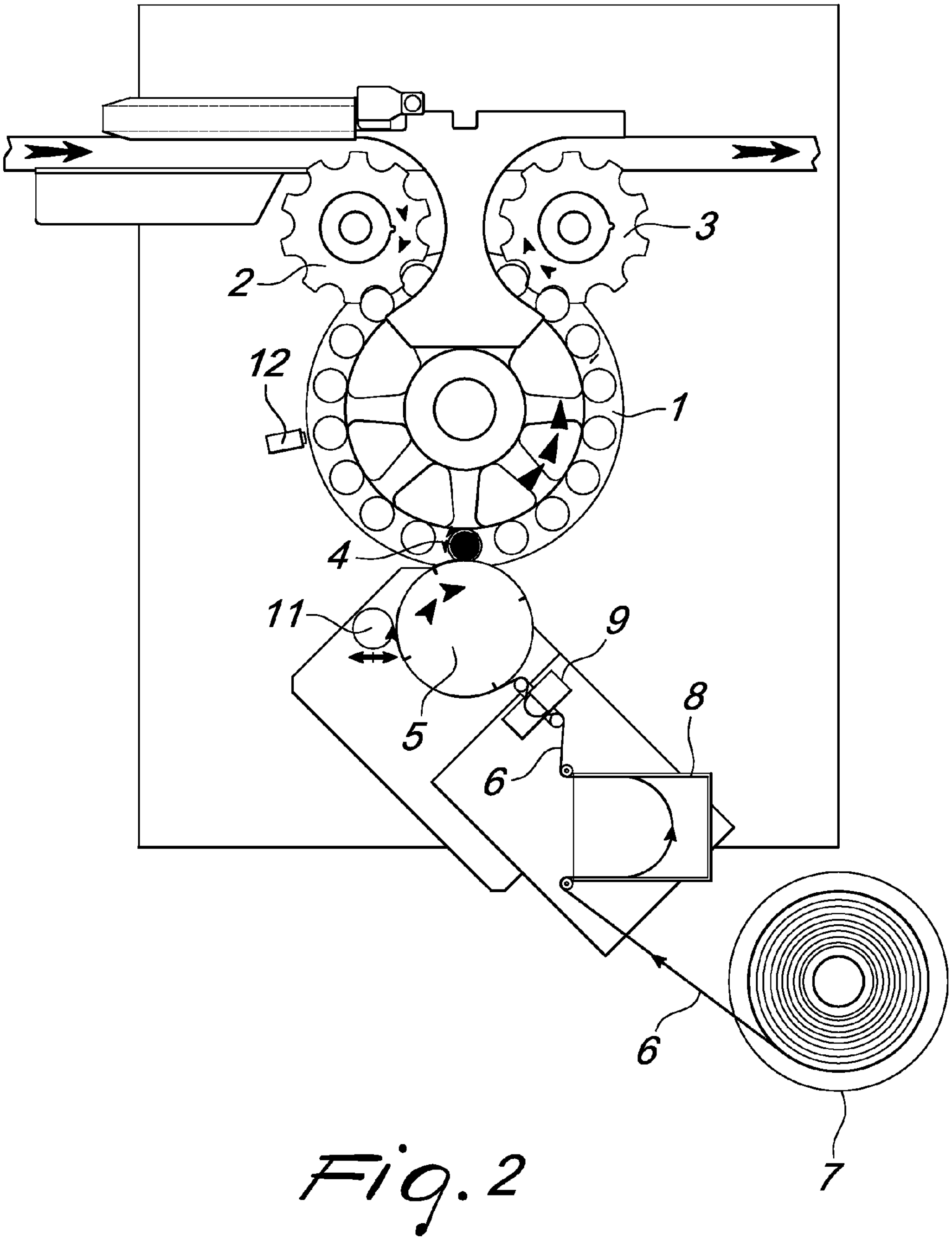
FIG. 2 is again a schematic plan view of the machine according to another embodiment.

The embodiment of FIG. 2 provides for the presence of a rotating roller 11, which is provided with means adapted to move it from a position in which it is spaced from the drum 5, not shown in the figure, to the operating position, shown in the figure, of substantial contact with such drum upstream of the tangent position of such drum with respect to the carousel.

The transfer of the roller 11 to the operating position, in which the labels that would not find on the carousel 1 a corresponding container onto which to be applied are collected, is performed, by the means with which such roller is provided, following a command that arrives from a sensor, such as a photocell 12 when it detects the lack of a container.

The described invention is susceptible of numerous modifications and variations, all of which are within the scope of the appended claims; all the details may further be replaced with other technically equivalent elements.

The disclosures in Italian Patent Application No. MN2008A000030 from which this application claims priority are incorporated herein by reference.

The invention claimed is:

1. A machine for labeling by means of pre-pasted labels printed on a ribbon, comprising a rotating carousel provided with pans for supporting containers to be labeled, and a rotating drum for cutting and transferring each individual label onto the containers which, in the motion of the carousel, progressively face said drum, wherein said drum supports each individual label and said drum is arranged adjacent said rotating carousel so as to be adapted to transfer and apply each individual label directly to a respective container supported by said rotating carousel, the machine further comprising a rotating roller, which is arranged adjacent to said drum and which is adapted to receive directly from said drum each individual label designed to be applied to a container that is not present on the corresponding pan of the carousel.

2. The machine according to claim 1, wherein the rotating roller is arranged substantially in contact with the label cutting and transfer drum downstream of the tangent position of said drum with respect to the rotating carousel.

3. The machine according to claim 1, wherein the rotating roller is movable from a position in which it is spaced from the label cutting and transfer drum to a position of substantial contact with said drum upstream of a tangent position of said drum with respect to the rotating carousel as a consequence of a command that arrives from a sensor that detects a lack of a container on a corresponding pan of the carousel.

4. The machine according to claim 1, wherein the rotating roller is made of sponge material.

5. The machine according to claim 1, wherein the rotating roller is made of elastic material.

* * * * *